| United States Patent [19] | [11] | 4,172,194 |
|---|---|---|
| Scoggins et al. | [45] | Oct. 23, 1979 |

[54] PRODUCING FIBER GRADE POLYAMIDE FROM TEREPHTHALIC ACID AND 5-METHYL-1,9-NONANEDIAMINE

[75] Inventors: Lacey E. Scoggins; Robert W. Campbell, both of Bartlesville, Okla.

[73] Assignee: Phillips Petroleum Company, Bartlesville, Okla.

[21] Appl. No.: 851,328

[22] Filed: Nov. 14, 1977

[51] Int. Cl.$^2$ .............................................. C08G 69/28
[52] U.S. Cl. ...................................... 528/336; 526/71; 528/324; 528/331; 528/338; 528/339; 528/340; 528/345; 528/349
[58] Field of Search ............. 260/78 R; 528/349, 336, 528/339, 340, 338, 331

[56] References Cited

U.S. PATENT DOCUMENTS

| 4,051,087 | 9/1977 | Scoggins et al. ................ 260/78 R |
| 4,060,517 | 11/1977 | Mertes et al. ...................... 260/78 R |

*Primary Examiner*—Harold D. Anderson

[57] ABSTRACT

Terephthalic acid and a diamine, always including 5-methyl-1,9-nonanediamine, and a lower fatty acid, e.g., acetic acid, are admixed with water, the water is evaporated, the concentrated mixture is heated (100°–200° C., ½–2 hrs.); then heated further (125°–295° C., ½–3 hrs., autogenous pressure up to 150–600 psig) with venting as needed; decompressed to atmospheric pressure (¼–2 hrs., 245°–295° C.); and heated (270°–295° C., ½–2 hrs.) to produce a polyamide having good acid and basic dye receptivity, inherent viscosity, melt spinning and drawing characteristics. An isomeric mixture of diamines containing 5-methyl-1,9-nonanediamine, and 2,4-dimethyl-1,8-octanediamine, 2,4,6-trimethyl-1,7-heptanediamine and/or 4-isopropyl-1,7-heptanediamine can be the starting 5-methyl-1,9-nonanediamine-furnishing material. The diamine-furnishing material contains at least one principal diamine component having the formula H$_2$NRNH$_2$, where R is selected from the group consisting of 5-methylnonamethylene, 2,4-dimethyloctamethylene, 2,4,6-trimethylheptamethylene, and 4-isopropylheptamethylene, the R in the formula of at least about 50 percent of the principal diamine component molecules initially present in the reaction being 5-methylnonamethylene. Other structural units, up to about 20 mole percent, can be present in the product which preferably will be at least 90 mole percent and up to about 98 mole percent and even up to about 100 mole percent derived from the foregoing recited terephthalic acid and diamines. Such other structural units are supplied by, e.g., other diamines, other dicarboxylic acids, amino acids and lactams.

16 Claims, No Drawings

PRODUCING FIBER GRADE POLYAMIDE FROM TEREPHTHALIC ACID AND 5-METHYL-1,9-NONANEDIAMINE

This invention relates to the production of a polyamide. In one of its aspects, it relates to the formation of a polyamide using terephthalic acid and at least one diamine. Further, the invention relates to the production of fiber grade polyamide from terephthalic acid and a reactant containing 5-methyl-1,9-nonandediamine.

In one of its concepts, the invention in a series of defined steps causes interreaction between terephthalic acid and at least a principal diamine component and a lower fatty acid, e.g., acetic acid, under specified conditions of temperature, time, pressure and proportions, to produce a polyamide having a desirable balance of carboxylic acid and amine end groups of good dyeability with both basic and acid dyes and with an inherent viscosity permitting good performance in melt spinning and drawing operation; the diamine-furnishing material containing at least one principal diamine component having the formula $H_2NRNH_2$, where R is selected from the group consisting of 5-methylnonamethylene, 2,4-dimethyloctamethylene, 2,4,6-trimethylheptamethylene, and 4-isopropylheptamethylene, the R in the formula of at least about 50 percent of the principal diamine component molecules initially present in the reaction being 5-methylnonamethylene; preferably 5-methylnonamethylene will be the R in at least about 70 percent, more preferably at least about 85 percent, of the principal diamine component molecules initially present in the reaction. In another of its concepts, the invention contemplates a series of steps including a reaction as above set forth wherein a lower fatty acid is present in the process to provide together with the other ingredients a desired inherent viscosity and therefore desirable melt spinning and melt drawing properties.

In a further concept of the invention the steps involve admixing water, terephthalic acid and at least said principal diamine component, the amount of water to total monomers being sufficient to facilitate solution and handling thereof; at a suitable pressure evaporating water by heating the aqueous mixture at a temperature in the approximate range of from about 100° to 220° C. for a time in the approximate range of from about ½ to about 2 hrs. to evaporate approximately from about 60 to about 80% of the water; heating the thus concentrated mixture at a temperature in the approximate range of from about 125° to about 295° C. for a time in the approximate range of from about ½ to about 3 hrs. under autogenous pressure of up to about 150 to about 600 psig with venting as needed to maintain the desired pressure, to convert monomers to a polymeric form to fix the same in the mixture; decompressing the mixture, thus obtained, by venting the mixture to about atmospheric pressure during a time period of from about ¼ to about 2 hrs. at a temperature maintained in the approximate range of from about 245° to about 295° C.; and heating the decompressed mixture at a temperature in the approximate range of from about 270° to about 295° C. for a time in the approximate range from about ½ to about 2 hrs. to cook the same to produce said polyamide; the ratio of total diamines to total dicarboxylic acids which may be present in the mixture being in the range of from about 1.03:1 to about 1.05:1, and there being present also in the process at least prior to the step of heating the decompressed mixture a lower fatty acid in a mole ratio of lower fatty acid to total dicarboxylic acid in the approximate range of from about 0.03:1 to about 0.07:1. In a further concept still the invention provides a process for producing a polyamide wherein at least one principal diamine component is a mixture containing 5-methyl-1,9-nonanediamine and 2,4-dimethyl-1,8-octanediamine, 2,4,6-trimethyl-1,7-heptanediamine and/or 4-isopropyl-1,7-heptanediamine. Further, the invention provides such a process for producing a polyamide in which there can be present in the polyamide product up to about 20 mole percent of recurring structural units derived from other diamines, other dicarboxylic acids, amino acids, and/or lactams albeit the polymer generally will have at least 90 mole percent, preferably at least 95 mole percent and more preferably at least 98 mole percent, and even up to about 100 mole percent of its recurring structural units as shown in formula I,

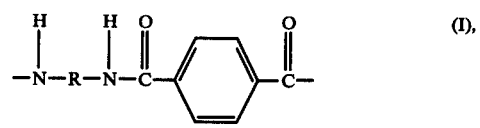

wherein R is selected from the group consisting of 5-methylnonamethylene, 2,4-dimethyloctamethylene, 2,4,6-trimethylheptamethylene, and 4-isopropylheptamethylene, at least 50 percent, preferably at least 70 percent, more preferably at least 85 percent, of the R groups being 5-methylnonamethylene.

In a still further concept of the process of the invention when other recurring structural units are present in the polymer, generally they will have a structure characterized by at least one of the formulas

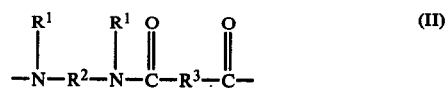

and

wherein the $R^1$, $R^2$, $R^3$, and $R^4$ are as defined herein.

Polyamides from terephthalic acid and 5-methyl-1,9-nonanediamine are known to be useful for the production of fibers. To perform well in melt spinning and drawing operations, during the rapid production of good fibers, the polyamide is required to have an inherent viscosity within a relatively narrow range. If the inherent viscosity is too high, the spun fiber exhibits surface roughness and other irregularities which cause difficulties in spinning and drawing operations. If the inherent viscosity is too low, the polymer tends to drip or sag during spinning, giving uneven filaments which are difficult to take up and draw. Additionally, for good dyeability with both basic and acid dyes, the polyamide should have a desirable balance of carboxylic acid and amine end groups.

It is an object of this invention to produce a polyamide. It is another object of this invention to provide a process for the production of a polyamide. It is a further object of this invention to provide for the production of a polyamide from terephthalic acid and 5-methyl-1,9-nonanediamine. It is a further object of the invention to provide a polyamide useful for the production of fibers and which will perform well in melt spinning and drawing operations during the rapid production of fibers of good quality. Still, it is a further object of the invention to provide a process for the production of a polyamide from terephthalic acid and 5-methyl-1,9-nonanediamine or from a mixture furnishing the same which yields a polyamide having an inherent viscosity within a relatively narrow defined range rendering the polyamide useful for spinning and drawing operations while avoiding surface roughness and other irregularities.

Other aspects, concepts and advantages are apparent from a study of this disclosure and the claims.

According to the present invention, there is provided a process for the production of a polyamide having a desirable balance of carboxylic acid and amine end groups for good dyeability with both basic and acid dyes and with an inherent viscosity permitting good performance in melt spinning and drawing operations which comprises admixing water, terephthalic acid and at least 5-methyl-1,9-nonanediamine, the water being sufficient for facilitating solution and handling, the water usually being present in an approximate weight ratio of water to total monomers of from about 0.9:1 to about 1.1:1, the 5-methyl-1,9-nonanediamine being present in a proportion such that in the product, the structural units derived from diamine will be derived at least therefrom and also sufficient to yield a polyamide having said properties, at a suitable pressure evaporating water at a temperature in the approximate range of from about 100° to about 200° C. for a time in the approximate range of from about ½ to about 2 hrs. To evaporate from about 60 to about 80% of the water; heating the thus concentrated mixture at a temperature in the approximate range of from about 125° to about 295° C. for a time in the approximate range of from about ½ to about 3 hrs., under an autogenous pressure of up to about 150 to about 600 psig with venting as needed to maintain the desired pressure, thus to convert monomers to a polymeric form to fix the same in the mixture; decompressing the mixture, thus obtained, by venting the mixture to about atmospheric pressure during a time period of from about ¼ to about 2 hrs. at a temperature maintained in the approximate range of from about 245° to 295° C.; and heating the decompressed mixture at a temperature in the approximate range of from about 270° to about 295° C. for a time in the approximate range of from about ½ to about 2 hrs. to cook the same to produce a polyamide; providing in the process prior to the heating step which follows immediately the decompression step a lower fatty acid, in a mole ratio of lower fatty acid to total dicarboxylic acid in the approximate range of from about 0.03:1 to about 0.07:1; the ratio of total diamines to total dicarboxylic acids being in the range of from about 1.03:1 to about 1.05:1.

Also, according to the invention in a process described there can be present at least one other diamine selected from 2,4-dimethyl-1,8-octanediamine, 2,4,6-trimethyl-1,7-heptanediamine and 4-isopropyl-1,7-heptanediamine.

Still according to the invention there is provided a process for producing a polyamide product or polymer which can contain up to about 20 mole percent of structural units furnished by compounds in the starting mixture other than those diamines earlier named which can be represented by the formula $H_2NRNH_2$, R being as earlier defined, such other structural units generally being characterized by one of formulas (II) and (III) wherein each $R^1$ is independently selected from the group consisting of hydrogen and alkyl radicals having 1 to 4 carbon atoms, $R^2$ is a divalent hydrocarbon radical having from 6 to 16 carbon atoms, $R^3$ is a divalent hydrocarbon radical having from 4 to 14 carbon atoms, and $R^4$ is a divalent acyclic hydrocarbon radical having from 5 to 13 carbon atoms.

In addition to the diamines earlier mentioned, examples of diamines of which not more than minor amounts will be present, which, if present, give rise to recurring units of formula II are hexamethylenediamine, N-methylhexamethylenediamine, N,N'-dimethylhexamethylenediamine, octamethylenediamine, nonamethylenediamine, decamethylenediamine, N,N'-dibutylhexadecamethylenediamine, 1,4-cyclohexanediamine, 1,4-bis(aminomethyl)cyclohexane, or bis(4-aminocyclohexyl)methane.

Examples of other dicarboxylic acids which may be present in minor amounts and which also give rise to recurring units of formula II are adipic acid, suberic acid, azelaic acid, dodecanedioic acid, hexadecanedioic acid, 1,4-cyclohexanedicarboxylic acid, and sebacic acid.

Examples of amino acids which can be present in minor amounts and which give rise to recurring units of formula III are 6-aminohexanoic acid, 8-aminooctanoic acid, 10-aminodecanoic acid, 12-aminododecanoic acid, N-methyl-6-aminohexanoic acid, N-ethyl-7-aminoheptanoic acid, N-isopropyl-12-aminododecanoic acid, or N-butyl-14-aminotetradecanoic acid.

Lactams, which can be present in minor amounts and can be lactams such as a lactam of any of the above-named amino acids and which give rise to recurring units of formula III, can be used in the starting mixture.

The lower fatty acid will have 2 to 4 carbon atoms and can be 1 or more of acetic, propionic, 2-methylpropionic and butyric acid. Acetic acid is now preferred. The fatty acid will be present initially or added later in the process no later than in step 3, described in the following.

Generally, the process of the invention, with the foregoing in mind, can be described as follows:

The invention provides a process for producing a polyamide having a desirable molecular weight and balance of carboxylic acid and amine end groups, imparting to the polyamide good performance characteristics including desirable inherent viscosity, melt spinning and drawing properties, and good dyeability with basic and acid dyes, which comprises steps as follow conducted upon terephthalic acid and at least one principal diamine component having the formula $H_2NRNH_2$, where R is selected from the group consisting of 5-methylnonamethylene, 2,4-dimethyloctamethylene, 2,4,6-trimethylheptamethylene, and 4-isopropylheptamethylene, the R in the formula of at least about 50 percent of the principal diamine component molecules initially present in the reaction being 5-methylnonamethylene;

STEP 1. (Mixing)

Admixing water, dicarboxylic acid and diamine in an approximate weight ratio of water to total monomers sufficient to facilitate solution and handling.

STEP 2. (Evaporation)

At a suitable pressure evaporating water by heating the aqueous mixture to a temperature within the approximate range of from about 100° to 220° C. for a time in the approximate range of from about ½ to about 2 hrs. to evaporate approximately from about 60 to about 80% of the water.

STEP 3. (Fixation)

Heating the thus concentrated mixture at a temperature in the approximate range of from about 125° to about 295° C. for a time in the approximate range of from about ½ to about 3 hrs. under an autogenous pressure of up to about 150 to about 600 psig with venting as needed to maintain the desired pressure, thus to convert monomers to a polymeric form to fix the same in the mixture.

STEP 4. (Decompression)

Decompressing the mixture, thus obtained, by venting the mixture to about atmospheric pressure during a time period of from about ¼ to about 2 hrs. at a temperature maintained in the approximate range of from about 245° to about 295° C.

STEP 5. (Cooking)

Heating the decompressed mixture at a temperature in the approximate range of from about 270° to about 295° C. for a time in the approximate range of from about ½ to about 2 hrs. to cook the same to produce said polyamide;

the ratio of total diamines to total dicarboxylic acids being in the range of from about 1.03:1 to about 1.05:1, and there being present also in the process at least prior to step 5 a lower fatty acid in a mole ratio of lower fatty acid to total dicarboxylic acid in the approximate range of from about 0.03:1 to about 0.07:1.

As may be desired, additives, e.g., thermoxidation stabilizers such as manganese lactate, delustrants such as titanium dioxide, or dispersing agents for the delustrant, e.g., sodium pyrophosphate, can be present initially or added later in the process, preferably prior to the last step.

The mole ratio of total diamines to total dicarboxylic acids specified to be within the range of from about 1.03:1 to about 1.05:1 has been determined as demonstrated by the data herein. Thus, in run 10 the product was insoluble; and in run 11 the inherent viscosity was 0.55. The need to use a lower fatty acid is demonstrated by run 9, the inherent viscosity of the polymer being higher than desired for melt spinning.

If desired during the cooking step, step 5, a slight flow of an inert gas such as nitrogen can be passed over or through the mixture to preclude air and to aid in the removal of volatile substances.

The five steps of the invention permit neatly accomplishing the desired results for each step. In a now not-preferred form of the invention, these steps can be performed to a real extent in the same vessel.

It is now preferred to employ a vessel for evaporation and to then employ a second vessel for the remaining steps.

One skilled in the art having studied this disclosure may somewhat depart from the specified pressures in the evaporation step, the pressure being preferred to avoid evaporation of the monomers in the evaporation step.

The process of this operation can be conducted as a continuous, semicontinuous, or batch process.

Polyamides produced by the process of this invention will have about 10 to about 110 milliequivalents of amine groups per kilogram of polymer, preferably 40–80 milliequivalents per kilogram, and at least 20 milliequivalents of acid groups per kilogram of polymer, as well as an inherent viscosity, determined at 30° C. in m-cresol at a polymer concentration of 0.5 gram per 100 milliliters solution, of about 0.65 to about 1.0, preferably about 0.70 to about 0.90. These polyamides will exhibit good dyeability with both basic and acid dyes and perform well in melt spinning and drawing operations.

Although the polyamides produced by the process of this invention are particularly valuable for use in the production of fibers, they can be employed in other applications, e.g., as molding resins, as hot melt adhesives, or in the production of coatings or films.

The polyamides produced by the process of this invention can be blended with various additives such as fillers, pigments, stabilizers, softeners, extenders, or other polymers. For example, there can be incorporated in the polymers produced by the process of this invention substances such as graphite, carbon black, titanium dioxide, glass fibers, carbon fibers, metal powders, magnesia, silica, asbestos, wollastonite, clays, wood flour, cotton floc, alpha cellulose, mica, and the like. If desired, such additives can be added prior to or during the process.

EXAMPLES

In a series of runs polyamides were prepared by the following procedure, except as shown otherwise in Table I or footnotes thereto. To a solution prepared from the diamine(s), terephthalic acid (TPA) or adipic acid (AdA), and acetic acid (HOAc), if used, in water, in a polymerization reactor equipped with stirrer and means for removal of volatile substances were added titanium dioxide and manganese lactate in amounts of 0.3 weight percent and 0.00525 weight percent, respectively, of the amount of polymer which theoretically would be produced. The dicarboxylic acid was employed in an amount of 0.3 mole. The weight ratio of water to total monomers, i.e., to diamine(s) plus dicarboxylic acid, was 0.97–1.06:1. In some instances sodium pyrophosphate also was employed. The reactor was then flushed with nitrogen, after which the polymerization was conducted in four additional steps as described above. In each of the runs the extent of water removal during the evaporation step was within the range of 60 percent to 80 percent. A slight flow of nitrogen was passed over the reaction mixture during the cooking step in each of the runs. The polymerization conditions and descriptions of the resulting polymers are summarized in Table I.

TABLE I

| | Mole Ratio | | Evaporation | | | Fixation | Max. | | Decompression | | Cooking | | | End Groups, meq/kg | |
|---|---|---|---|---|---|---|---|---|---|---|---|---|---|---|---|
| Run | MND[a]/TPA | HOAc/TPA | Temp., °C. | Pressure, psig | Time min. | Temp., °C. | Pressure, psig | Time, min. | Temp., °C. | Time min. | Temp., °C. | Time, min. | IV[b] | Acid[c] | Amine[d] |
| 1[e] | 1.040[f] | 0.060 | 180–185 | 20–60 | 105 | 185–290 | 400 | 150 | 290 | 30 | 290 | 75 | 0.76 | 38 | 27 |
| 2 | 1.040[g] | 0.060 | 180–200 | 40–50 | 90 | 200–290 | 380 | 85 | 290 | 30 | 290 | 75 | 0.70 | 64 | 26 |
| 3[e] | 1.0425[f] | 0.055 | 175–185 | 20–50 | 90 | 185–290 | 280 | 160 | 290 | 30 | 290 | 75 | 0.77 | 32 | 30 |
| 4[e] | 1.045[f] | 0.050 | 175–190 | 20–45 | 110 | 190–290 | 330 | 160 | 290 | 30 | 290 | 75 | 0.74 | 35 | 37 |
| 5[e] | 1.050[f] | 0.050 | 180 | 60–70 | 110 | 180–290 | 500 | 160 | 290 | 30 | 290 | 75 | 0.81 | 30 | 85 |
| 6[h] | 1.040[i] | 0.050 | 150–170 | 16–20 | 64 | 170–265 | 250 | 68 | 265–285 | 90 | 285–290 | 65 | 0.76 | 44 | 65 |
| 7[e] | 1.050[f] | 0.040 | 185 | 50–60 | 100 | 185–290 | 500 | 160 | 290 | 30 | 290 | 75 | 0.82 | 26 | 100 |
| 8 | 1.030[o] | 0.035 | 75–134 | 14.5 | 60 | 135–250 | 250 | 85 250–282 | 90 282–290 | 30 | 290 | 75 | 0.86 | 52 | 77 |
| 9 | 1.040[g] | 0.000 | 190–200 | 50 | 90 | 200–290 | 380 | 80 | 290 282 | 30 | 290 | 75 | 1.28 | 36 | 123 |
| 10 | 1.000[g] | 0.000 | 180 | 20–60 | 90 | 180–290 | 380 | 90 | 290 | 30 | 290 | 75 | Insol | 92 | 21 |
| 11 | 1.000[g] | 0.060 | 180 | 10–50 | 90 | 180–290 | 280 | 90 | 290 | 30 | 290 | 75 | 0.55 | 189 | 4 |
| 12[k] | 1.040 C6D[j] TPA | 0.060 HOAc TPA | 180 | 10–50 | 90 | 180–290 | 230 | 90 | 290 | 30 | 290 | 75 | Insol | —[l] | —[l] |
| 13[n] | 1.040 C6D[j] AdA | 0.060 HOAc AdA | 180 | 4–50 | 90 | 180–290 | 400 | 90 | 290 | 30 | 290 | 75 | Insol | Insol | —[l] |
| 14 | 1.040 | 0.060 | 190–200 | 50–60 | 90 | 200–290 | 360 | 90 | 290 | 30 | 290 | 75 | 0.55 | 23 | —[l] |

Footnotes to Table I:

[a] MND represents a mixture of branched $C_{10}$ diamines comprising largely 5-methyl-1,9-nonanediamine.
[b] Inherent viscosity, determined at 30° C. in m-cresol at a polymer concentration of 0.5 g/100 ml solution.
[c] Determined by dissolving 3 g polyamide in 75 ml benzyl alcohol and titrating with alcoholic KOH (0.05 normal) at 185° C. using phenolphthalein indicator.
[d] Determined by dissolving 2 g polyamide in a mixture of 100 ml 1,1,1,3,3,3-hexafluoro-2-propanol and 25 ml ethanol and titrating potentiometrically with alcoholic HCl (0.05 normal) at room temperature (about 25° C.).
[e] Sodium pyrophosphate, in an amount equal to 4.7 weight percent of the titanium dioxide used, was added to the polymerization recipe.
[f] The MND used consisted of 89.75 weight percent 5-methyl-1,9-nonanediamine, 9.54 weight percent 2,4-dimethyl-1,8-octanediamine, 0.01 weight percent 2,4,6-trimethyl-1,7-heptanediamine, and 0.70 weight percent 4-isopropyl-1,7-heptanediamine.
[g] The MND used consisted of 89.56 weight percent 5-methyl-1,9-nonanediamine, 10.02 weight percent 2,4-dimethyl-1-8-octane-diamine, 0.11 weight percent 2,4,6-trimethyl-1,7-heptanediamine, and 0.31 weight percent 4-isopropyl-1,7-heptanediamine.
[h] Terephthalic acid was used in an amount of 11.0 moles instead of 0.3 mole.
[i] The MND used consisted of 89.99 weight percent 5-methyl-1,9-nonanediamine, 9.96 weight percent 2,4-dimethyl-1,8-octane-diamine, 0.04 weight percent lights, and 0.01 weight percent heavies.
[j] $C_6D$ is hexamethylenediamine.
[k] The weight ratio of water to total monomers, i.e., to hexamethylenediamine plus terephthalic acid, was 1.64:1.
[l] Not determined.
[m] $C_{12}D$ is dodecamethylenediamine.
[n] The weight ratio of water to total monomers, i.e., to dodecamethylenediamine plus terephthalic acid, was 1.57:1. The mixture prepared from the monomers, acetic acid, and water, prior to the addition of titanium dioxide and manganese lactate, was a slurry instead of a solution.
[o] Terephthalic acid was used in an amount of 412.8 moles instead of 0.3 mole. Manganese lactate was added in an amount of 0.00515 weight percent of the amount of polymer which theoretically would be produced. The titanium dioxide was added as a 20 weight percent aqueous slurry during the fixation step.

Runs 1 to 8 in Table I were conducted in accordance with the process of this invention, and each of the polyamides from these eight runs had an inherent viscosity within the range desired for fiber production as well as a number of acid and amine end groups within the range desired for good dyeability of the polymer with acid and basic dyes.

A portion of the polyamide from Run 6 was readily melt spun at 260° C. into monofilament by employing a one hole, 20×50 mil spinneret and drawn at 125° C. at a draw ratio of 4.5X. The resulting filament had a tenacity of 4.4 gpd, an elongation of 19 percent, and an initial modulus of 33 gpd (ASTM D 2256-69, using an optional rate of elongation of 100 percent per minute).

Runs 9 to 11 were conducted by a process outside the scope of this invention, using ratios of MND, TPA, and HOAc (there was present no HOAc in Runs 9 and 10) which do not fulfill the requirements of the process of this invention, resulting in polyamides whose inherent viscosity and/or end group values are outside the desired ranges as apecified herein for polyamides produced by the process of this invention. Although the end group values were satisfactory for the polymer in Run 10, this polymer was of too high molecular weight to dissolve in m-cresol and did not have sufficient melt flow for melt spinning into fibers.

Runs 12 and 13 were conducted by a process outside the scope of this invention, employing the process conditions of this invention except that in Run 12 hexamethylenediamine was used and that in Run 13 dodecamethylenediamine was used, instead of branched $C_{10}$ diamine. Polymers insoluble in m-cresol which were thus obtained did not have sufficient melt flow for melt spinning into fibers. Run 14 also was conducted by a process outside the scope of this invention, employing the process conditions of this invention except that hexamethylenediamine and adipic acid instead of a branched $C_{10}$ diamine of the invention and terephthalic acid were used as monomers, resulting in a polymer which was of too low inherent viscosity for satisfactory melt spinning into fibers. Thus, the process conditions of this invention are not applicable broadly to the preparation of polyamides for use in readily producing fibers, but only to the preparation of good fiber-forming polyamides from selected monomers.

Thus, the foregoing information and the examples make it apparent that the particular starting materials given herein as such and the temperature, pressure, etc., conditions also given herein must all be substantially observed to obtain the desired viscosity and therefore the melt spinning and drawing characteristics.

Thus, from the foregoing, it appears that the inherent viscosity and melt spinning and drawing characteristics of the materials produced as herein described will fall within the ranges given herein.

The disclosures of the following patents are incorporated by reference. U.S. Pat. Nos. 3,839,295, Campbell et al., issued Oct. 1, 1974; 3,839,296, Campbell issued Oct. 1, 1974; 3,843,611, Campbell, issued Oct. 22, 1974; 3,869,400, Strand, issued Mar. 4, 1975; 3,904,677, Campbell, issued Sept. 9, 1975; and 3,980,621, Campbell et al, issued Sept. 14, 1976.

The foregoing patents, among others, relate to the general reactions or reaction which take place in the overall when a dicarboxylic acid and a diamine are converted to a polyamide. U.S. Pat. No. 3,869,400 describes some of the procedures to form the salt from the two reactants and then to polymerize the polyamide-forming salt.

One skilled in the art in possession of this disclosure, having studied the same, will recognize the differences in the steps of the combination of steps and ingredients of the claimed invention over the operations of the disclosure of these patents.

Reasonable variation and modification care possible in the scope of the foregoing disclosure and the appended claims to the invention, the essence of which is that there has been set forth a combination of steps, ingredients, ratios, additives, etc., permitting production of a polyamide product having the characteristics which are desirable as described.

We claim:

1. A process for producing a polyamide having a desirable molecular weight and balance of carboxylic acid and amine end groups, imparting to the polyamide good performance characteristics including desirable inherent viscosity, melt spinning and drawing properties, and good dyeability with basic and acid dyes, which comprises steps as follow conducted upon terephthalic acid and at least one principal diamine component each of the several molecules of which has the formula H$_2$NRNH$_2$, where R is at least 50% 5-methylnonamethylene and the remainder of R is selected from the group consisting of, 2,4-dimethyloctamethylene, 2,4,6-trimethylheptamethylene, and 4-isopropylheptamethylene;

STEP 1. admixing water, said acid and said diamine in an approximate weight ratio of water to total monomers sufficient to facilitate solution and handling, STEP 2. at a suitable pressure evaporating water by heating the aqueous mixture to a temperature within the approximate range of from about 100° to 220° C. for a time in the approximate range of from about ½ to about 2 hours to evaporate approximately from about 60 to about 80% of the water, STEP 3. heating the thus concentrated mixture at a temperature in the approximate range of from about 125° to about 295° C. for a time in the approximate range of from about ½ to about 3 hours under an autogenous pressure of up to about 150 to about 600 psig with venting as needed to maintain the desired pressure, thus to convert monomers to a polymeric form in the mixture, STEP 4. decompressing the mixture thus obtained by venting the mixture to about atmospheric pressure during a time period of from about ½ to about 2 hours at a temperature maintained in the approximate range from about 245° to about 295° C., and STEP 5. heating the decompressed mixture at a temperature in the approximate range of from about 270° to about 295° C. for a time in the approximate range of from about ½ to about 2 hours to cook the same to produce said polyamide;

the mole ratio of total diamines to total dicarboxylic acids which may be present in the mixture being in the range of from about 1.03:1 to about 1.05:1, and there being present also in the process at least prior to step 5 a lower fatty acid in a mole ratio of lower fatty acid to total dicarboxylic acid in the approximate range of from about 0.03:1 to about 0.07:1.

2. A process according to claim 1 wherein there is present at least one diamine selected from the group consisting of 2,4-dimethyl-1,8-octanediamine, 2,4,6-trimethyl-1,7-heptanediamine, and 4-isopropyl-1,7-heptanediamine.

3. A process according to claim 2 wherein 5-methyl-1,9-nonanediamine is present in a proportion to terephthalic acid such that R in the principal diamine furnished to the reaction will be at least about 70 percent 5-methylnonamethylene.

4. A process according to claim 3 wherein said proportion is such that R in the principal diamine furnished to the reaction will be at least about 85 percent 5-methylnonamethylene.

5. A process according to claim 1 wherein the polyamide produced is composed at least primarily of recurring structural units having the formula

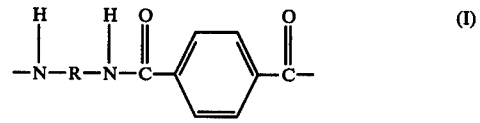

wherein the R in each unit is at least 50% 5-methyl-nonamethylene, and the remainder of R is selected from the group consisting of 2,4-di-methyloctamethylene, 2,4,6-trimethylheptamethylene, and 4-isopropylheptamethylene.

6. A process according to claim 5 wherein there is present at least one diamine selected from group consisting of 2,4-dimethyl-1,8-octanediamine, 2,4,6-trimethyl-1,7-heptanediamine, and 4-isopropyl-1,7-heptanediamine.

7. A process according to claim 5 wherein at least about 70 percent of the R groups are 5-methyl-1,9-nonanediamine.

8. A process according to claim 5 wherein at least about 85 percent of the R groups are 5-methylnonamethylene.

9. A process according to claim 5 wherein the polyamide product is composed of at least about 90 mole percent of structural units (I).

10. A process according to claim 9 wherein the mole percent is at least about 95.

11. A process according to claim 10 wherein the mole percent is at least about 98.

12. A process according to claim 5 wherein the polyamide product or polymer contains up to about 20 mole percent of other structural units, furnished by other compounds in the process, which can be characterized by at least one of the formulas

 (II)

 (III)

wherein each $R^1$ is independently selected from the group consisting of hydrogen and alkyl radicals having 1 to 4 carbon atoms, $R^2$ is a divalent hydrocarbon radical having from 6 to 16 carbon atoms, $R^3$ is a divalent hydrocarbon radical having from 4 to 14 carbon atoms, and $R^4$ is a divalent acyclic hydrocarbon radical having from 5 to 13 carbon atoms.

13. A process according to claim 12 wherein the other components representing the formula II radicals are selected from minor amounts of at least one hexamethylenediamine, N-methylhexamethylenediamine, N,N'dimethylhexamethylenediamine, N,N'-dibutylhexadecamethylenediamine, 1,4-cyclohexanediamine, 1,4-bis(aminomethyl)cyclohexane, or bis(4-aminocyclohexyl)methane; minor amounts of at least one of adipic acid, suberic acid, azelaic acid, sebacic acid, dodecanedioic acid, hexadecanedioic acid, or 1,4-cyclohexanedicarboxylic acid; for formula III minor amounts of at least one of 6-aminohexanoic acid, 8-aminooctanoic acid, 10-aminodecanoic acid, 12aminododecanoic acid, N-methyl-6-aminohexamoic acid, N-ethyl-7-aminodecanoic acid, 12-aminododecanoic acid, or N-butyl-14-aminotetradecanoic acid, and minor amounts of at least one lactam of any of the above-named amino acids.

14. A process according to claim 1 wherein the fatty acid is selected from acetic, propionic, 2-methylpropionic and butyric acids.

15. A process according to claim 14 wherein the fatty acid selected is acetic acid.

16. A process according to claim 1 wherein the weight ratio of water to total monomers in step 1 is in the approximate range of from about 0.9:1 to about 1.1:1.

* * * * *